May 4, 1948.  A. L. GALUSHA  2,440,940
GAS PRODUCER
Filed Aug. 18, 1943  5 Sheets-Sheet 1

INVENTOR
ALBERT L. GALUSHA
BY
Howson and Howson
HIS ATTORNEYS

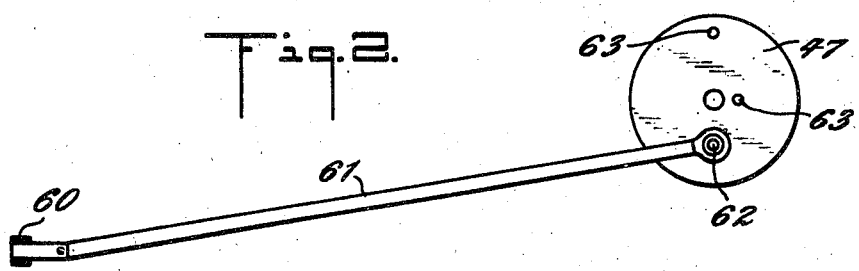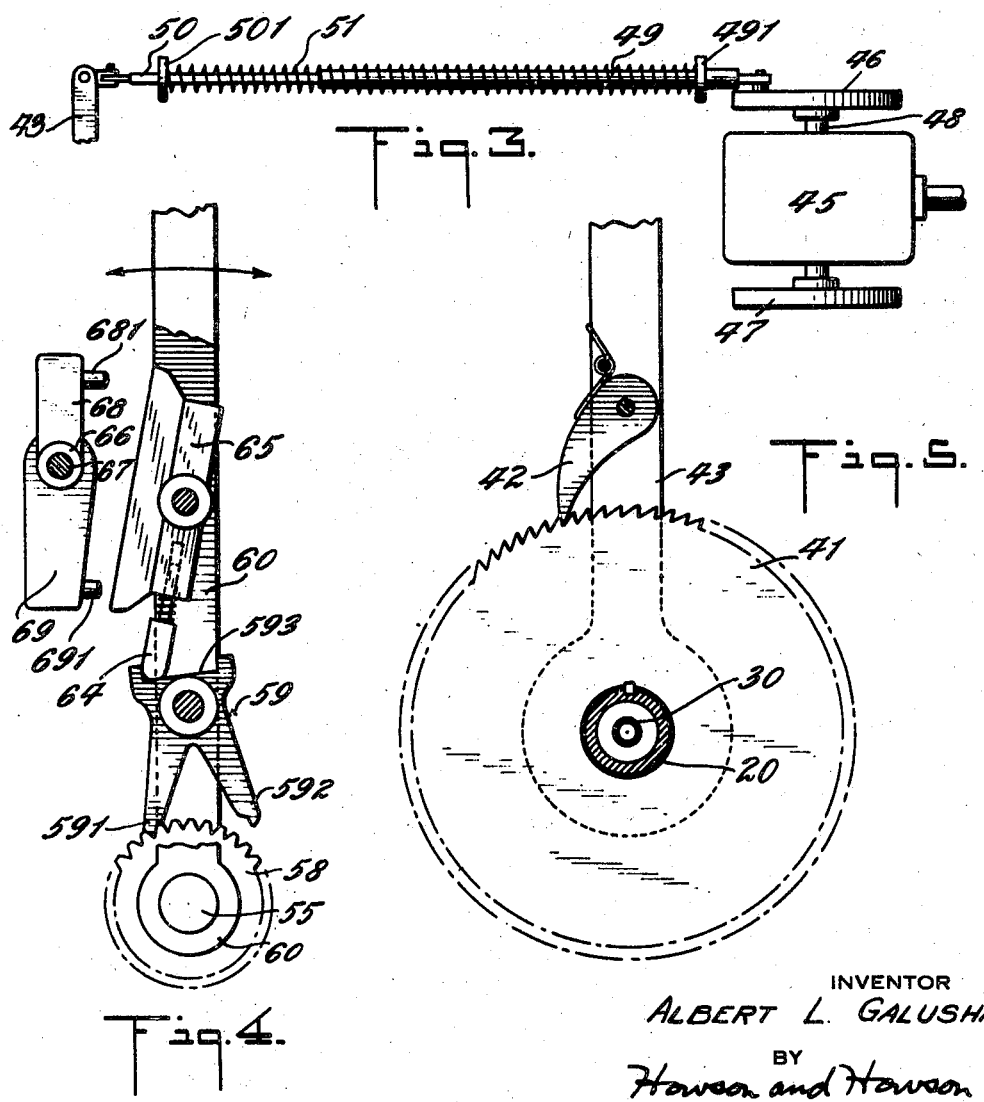

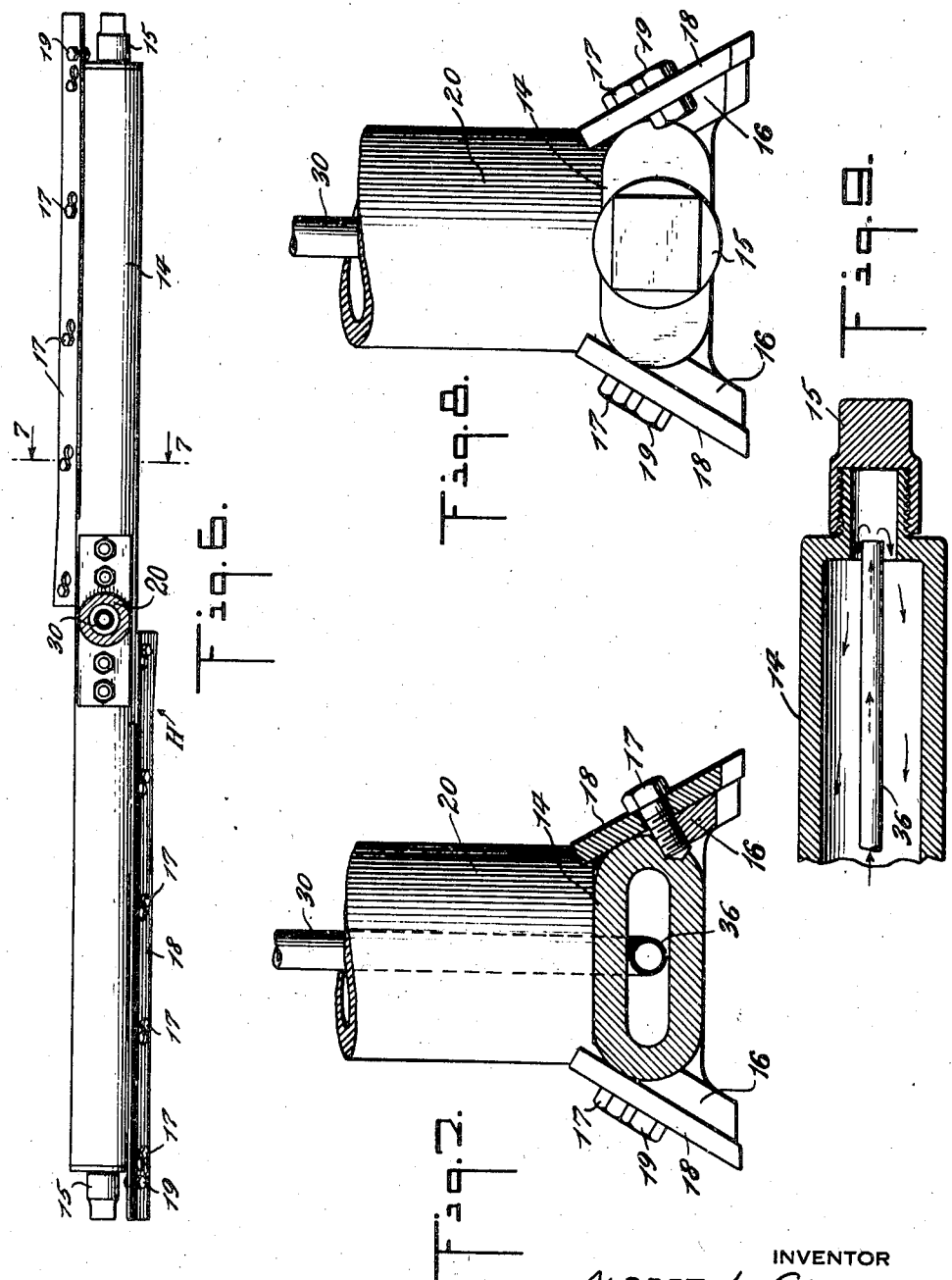

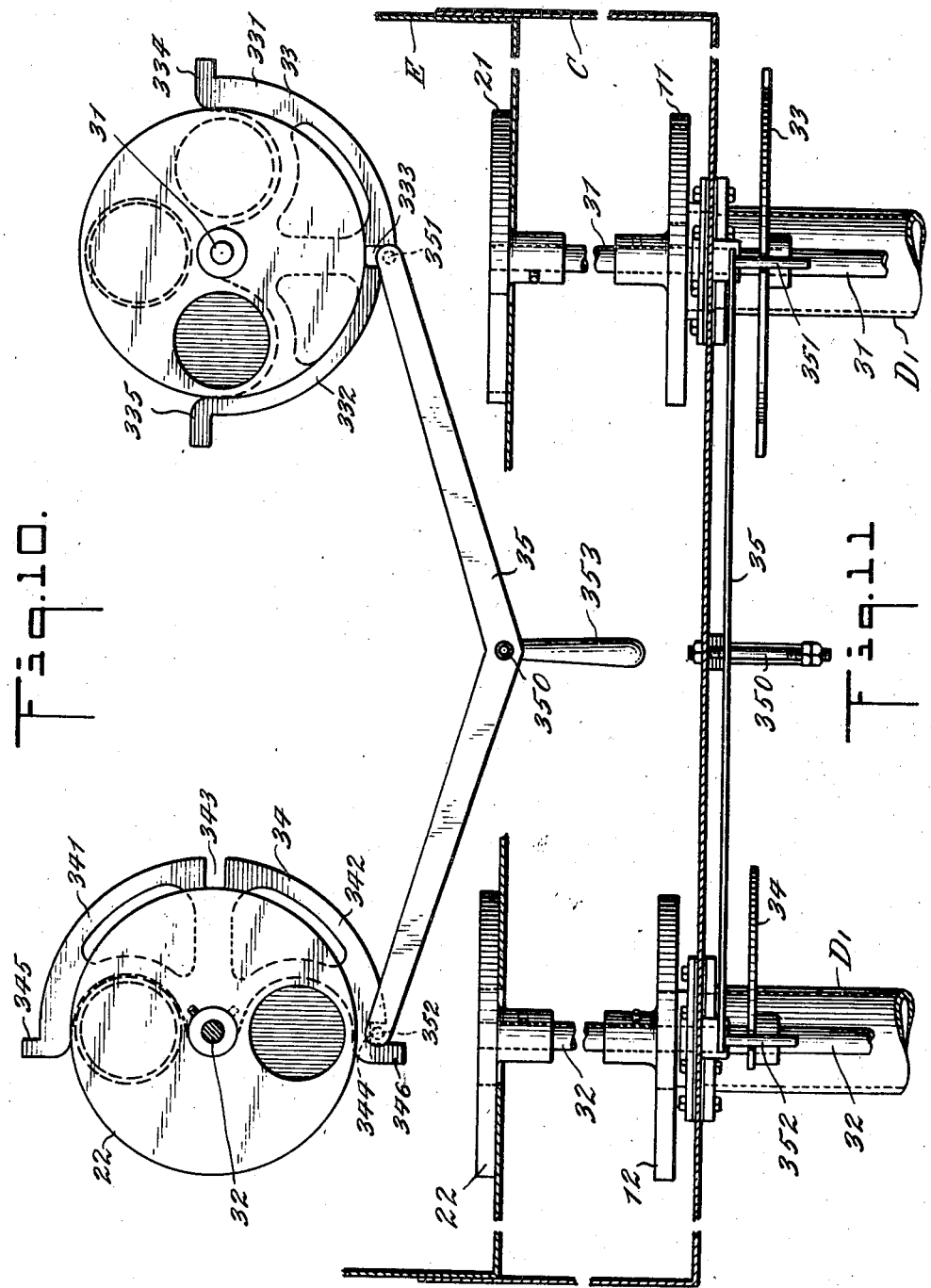

May 4, 1948. A. L. GALUSHA 2,440,940
GAS PRODUCER
Filed Aug. 18, 1943 5 Sheets-Sheet 5
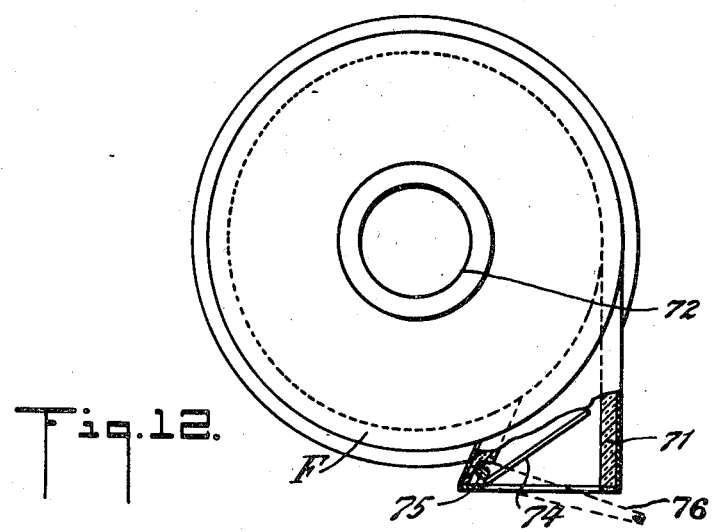
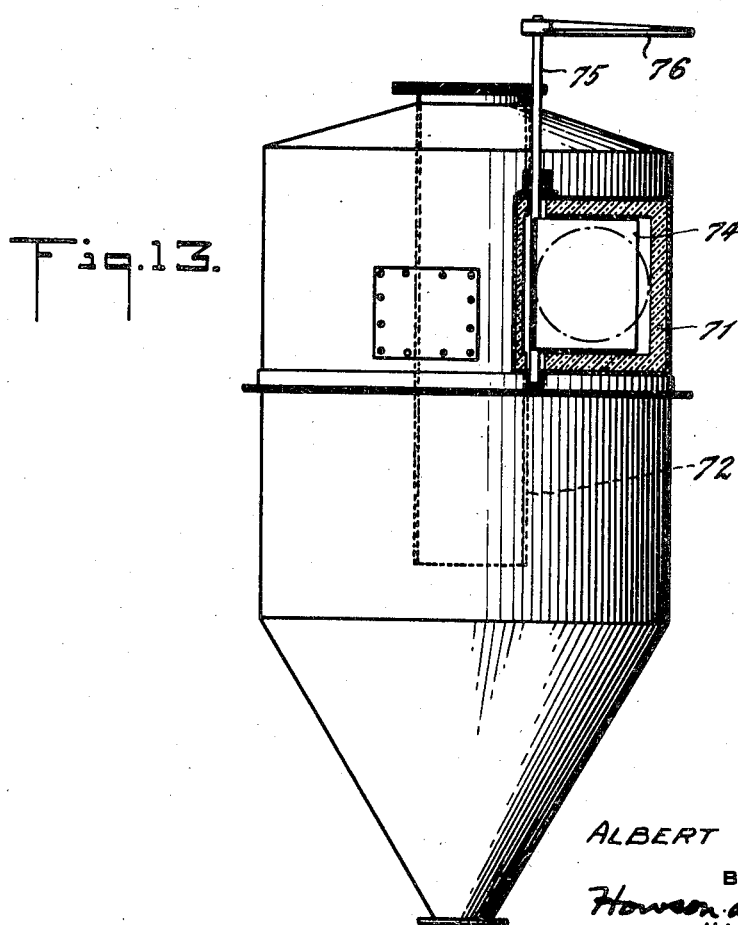
INVENTOR
ALBERT L. GALUSHA
BY
Howson and Howson
HIS ATTORNEYS Patented May 4, 1948

2,440,940

UNITED STATES PATENT OFFICE 2,440,940

GAS PRODUCER

Albert Leet Galusha, Caldwell, N. J.

Application August 18, 1943, Serial No. 499,155

14 Claims. (Cl. 48—76)

This invention relates to apparatus comprising gas producers and associated equipment for manufacturing what is commonly known as producer gas. It is an object of this invention to provide a gas producer constructed and arranged to deliver gas at a temperature low enough to permit of the gas being passed directly to a dust collector of a more efficient type. It is also an object of this invention to deliver the gas sufficiently cleaned and of sufficiently low a temperature to permit of the gas being passed through a suitable pump or pressure booster without having to wash and cool the gas to prevent damage to the pump or pressure booster. It is also an object of this invention to provide a gas producer with fuel feeding and distributing means of improved construction such that a fuel bed of uniform depth can be maintained to provide uniform cooling of the gas and it is a further object of this invention to provide control means for the fuel feeding means whereby improper operation of the fuel feeding means is prevented. It is also an object of this invention to provide fuel agitating means of improved construction and interlocking control means for the fuel feeding means.

Certain claims to the construction of my novel gas producer agitator means itself will be found in my divisional application for "Agitator for gas producer," Serial No. 221, filed January 2, 1948.

In the drawings:

Fig. 2 is a view in elevation of a detail of the operating means for raising and lowering the agitator;

Fig. 3 is a plan view of a detail of the operating means for rotating the agitator;

Fig. 4 is a plan view of the means for changing the direction of vertical movement of the agitator;

Fig. 5 is a fragmentary sectional view taken as on line 5—5 of Fig. 1 and showing a further detail of the operating means for rotating the agitator;

Fig. 6 is a sectional view taken as on line 6—6 of Fig. 1 and showing in plan view the agitator shown in Fig. 1;

Fig. 7 is a transverse sectional view of the agitator shown in Fig. 6 taken as on line 7—7 of Fig. 6;

Fig. 8 is an end view of the agitator shown in Fig. 6;

Fig. 9 is a partial longitudinal sectional view of an end portion of the agitator shown in Fig. 6;

Fig. 10 is a plan view of the interlocking means for the valve operating means controlling the passage of fuel to the gas producer;

Fig. 11 is a broken view showing in elevation the relation of the interlocking means and the valve operating means;

Fig. 12 is a top plan view of the dust collector shown in Fig. 1, part of the intake being broken away to show the control valve more clearly; and Fig. 13 is a view in elevation of the dust collector shown in Fig. 12, part of the intake being broken away to show the control valve more clearly.

Figure 1:
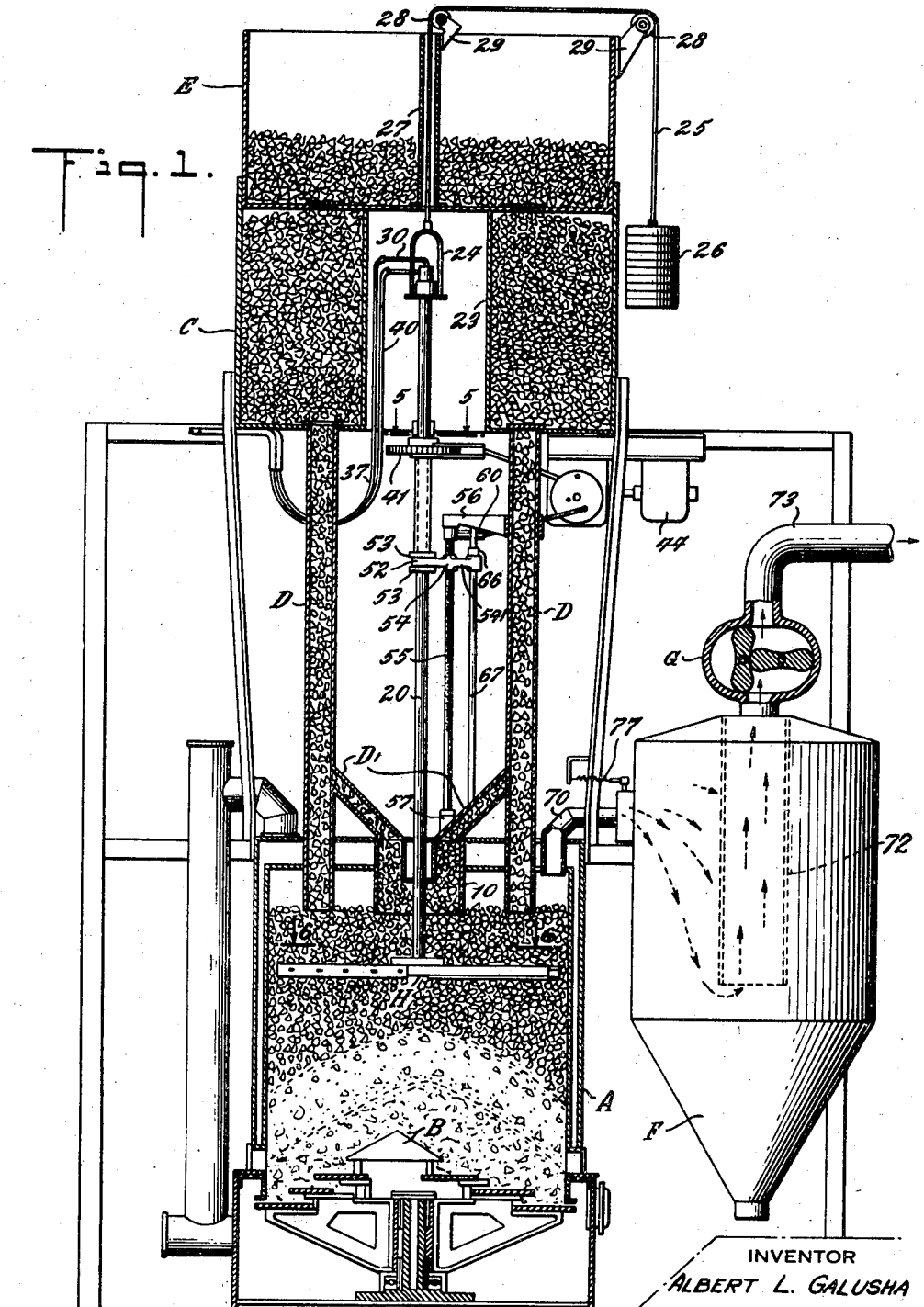
Fig. 1 is a view partly in vertical section and partly in elevation of a gas producer provided with a fuel agitator and directly associated with a dust collector and pump in accordance with this invention.

Apparatus in accordance with this invention comprises, as shown in the drawings, a water jacketed gas producer A having a rotary grate B and supplied with fuel from a feed bin C by means of a plurality of feed chutes D. The feed bin C is filled from a storage bin E. The air supplied to the grate is heated and given the desired amount of moisture by passing it through the upper portion of the water jacket of the gas producer while the gas produced passes from the gas producer directly to a dust collector F and then to a suitable pump or other type of gas pressure booster G by which it is delivered to the outlet main under the desired pressure.

The feed chutes D, as shown, extend from substantially diametrically opposite portions of the feed bin C to corresponding portions of the gas producer. The feed chutes D are kept open to the feed bin and filled with fuel except when the feed bin is being filled from the storage bin or it is desired to reduce the feed of fuel to one side of the gas producer in order to equalize the depth of the ash bed. From a point adjacent the lower end of one or more of the feed chutes D a branch feed chute D' extends to a position closely adjacent the central portion of the gas producer. Fuel supplied by the branch feed chutes D' is confined to the central portion of the gas producer by means of a metal ring or cylindrical wall 10 which extends into the gas producer sufficiently to prevent the fuel spreading to a substantial degree as it is discharged beyond the lower edge of the ring. The main feed chutes D being substantially continuously filled, the branch feed chutes D' and the space within the ring 10 are likewise continuously filled. The metal ring or wall 10 has a gas-tight connection to the producer wall and prevents a vertical draft which would cause the burning of a hole through the fuel bed at the center of the producer where the horizontal stirring of the fuel bed by the agitator is insufficient to remove the ash or otherwise prevent the burning to the top of the fuel bed.

To control the passage of the fuel from the storage bin E to the feed bin C and from the feed bin C to the feed chutes D valve-controlled openings are provided, each opening from the storage bin E to the feed bin C being vertically alined with an opening from the feed bin C to a feed chute D. The valves controlling these openings are flat circular disks having openings of equal size with the openings leading from the bins. As shown in Figs. 10 and 11, valves 21 and 22 control the passage of fuel from the bin E while valves 11 and 12 control the passage of fuel from the bin C. The vertically alined valves 11 and 21 are secured to an operating shaft 31 with their openings displaced 180° so that when one valve is in open position the other valve is in closed position. The disks forming the valves are large enough, however, to provide an intermediate position in which both valves are closed. The valves 12 and 22 are similarly fixed on a shaft 32 and both shafts 31 and 32 project beyond the lower wall of the feed bin C, the lower end portions of the shafts being shaped for the application of an operating wrench or handle. To prevent the operation of the valves so that a valve controlling the feeding of fuel to a chute and a valve controlling the feeding of fuel from the storage bin to the feed bin are both open at the same time there is provided an interlocking means comprising arcuate members 33 and 34 fixed on the shafts 31 and 32, respectively, below the feed bin C and an angular lever 35 pivotally mounted at 350 on the feed bin C for a slight rotary movement between the feed bin C and the arcuate members 33 and 34. The lever 35 is provided with the pins 351 and 352 fixed in the ends thereof and with an operating handle 353.

The arcuate member 33 is formed with perimetric sections 331 and 332 of different radii, a notch 333 between the sections 331 and 332 and stop or abutment portions 334 and 335 at the remote ends of the sections 331 and 332 respectively. The arcuate member 34 has the perimetric sections 341 and 342 of the same radius, a relatively deep notch 343 separating the sections 341 and 342, a relatively shallow notch 344 at the remote end of section 342 and stop or abutment portions 345 and 346 at the remote ends of sections 341 and 342 respectively. The relation of the lever 35 to the arcuate members 33 and 34 is such that the lever cannot be operated so that the pin 351 can be passed by the stop portions 334 and 335 and the pin 352 cannot be passed by the stop portions 345 and 346. However, by placing the pins in the various notches of the arcuate members the desired operations of the various valves may be secured.

As shown in Fig. 10, valve 12 is open while valve 22, 21 and 11 are closed. Pin 352 is in notch 344 and valves 22 and 12 cannot be operated. Pin 351 is not in notch 333 and arcuate member 33 can be rotated counterclockwise to open valve 11 but the radius of the section 331 of member 33 prevents the member 33 being rotated clockwise to open valve 21. Rotating lever 35 to place pin 351 in notch 333 withdraws pin 352 from notch 344 and arcuate member 34 can then be rotated clockwise either to a position where notch 343 can be engaged by pin 352 and both valves 22 and 12 are closed or to a position where the abutment 345 engages the pin 352 and the valve 22 is open and the valve 12 closed. During rotation of the arcuate member 34 the pin 352 bears against the member 34 so that the lever 35 cannot be operated except when the notch 343 is positioned to receive the pin 352. The lever 35 is also kept from operation when the stop portion 345 engages the pin 352. The pin 351 is thus held in the notch 333 and rotation of the arcuate member 33 in either direction is prevented so that both valves 21 and 11 are held in the closed position. With the arcuate member 34 positioned so that both valves 22 and 12 are closed, the pin 352 can be moved into the notch 343. Operation of the lever 35 to place pin 352 in the notch 343 withdraws pin 351 sufficiently from notch 333 that the arcuate member 33 can be operated either to engage the stop portion 335 against the pin 351 and open the valve 11 or to engage the stop portion 334 against the pin 351 and open the valve 21. However, in both positions of the arcuate member 33 in which a valve is open, the lever 35 is held in a position which keeps the pin 352 in the slot 343 and prevents operation of the arcuate member 34 and the valves 12 and 22. This locking device makes it impossible to open any upper valve if any lower valve is open. It is also impossible to open any lower valve if any upper valve is open. This control of the valves at all times prevents the valves being operated to provide an open passageway for gas to pass from the producer to the storage bin or for the outside air to pass through the bins into the producer to form an explosive mixture with the gas in the producer. However, it is possible to feed fuel through only one feed pipe or through more than one feed pipe at one time.

To prevent packing and insure the proper distribution of the fuel and the maintaining of a proper ash bed there is provided in the gas producer an agitator H comprising a substantially flat tubular member 14 having reduced threaded ends closed by removable caps 15. Downwardly inclined flanges 16 extend along one side from each end to the center of the tubular member 14, the flanged sides being oppositely positioned at the two ends of the tubular member. To each flange 16, bolts 17 detachably secure a wear plate 18 which extends the full length of the flange and projects both above the tubular member 14 and below the flange 16. Each bolt opening in the wear plate 18 comprises a portion adapted to receive the bolt head and a portion adapted to fit closely about the bolt shank so that the wear plate may be applied without removal of the bolts from the member 14. A bolt 19 engaging the wear plate and flange prevents longitudinal movement of the wear plate. The tubular member 14 is connected at its center to a pipe 20 which is open to the interior of the tubular member 14 and is suitably mounted for rotating and longitudinal movements in a bearing in the top of the gas producer and a bearing supported from the feed bin C. At its upper end the pipe 20 projects into a central opening formed in the feed bin C by an inner wall 23 of the feed bin and is rotatably supported in a yoke 24 connected by a cable 25 to a suitable counterweight 26. The cable 25 passes upwardly from the yoke 24 through a central opening in the storage bin E formed by the inner wall 27 of the storage bin and over pulleys 28 supported by suitable brackets 29 secured on the walls of the storage bin E.

Mounted in the pipe 20 and projecting from the upper end thereof is an inner pipe 30 which is connected at its lower end to branch pipes 36 extending to the ends of the tubular member 14. A cooling liquid is supplied to the pipe 30 by a flexible tubular connection 37 connected to a suitable source of supply. The cooling liquid supplied to the pipe 30 is discharged from the ends of the branch pipes 36, passes through the tubular member 14 and up the pipe 20 to be discharged at the closed upper end of the pipe 20 to a flexible discharge connection 40.

To rotate the agitator H there is provided a ratchet wheel 41 fixed on the pipe 20 and a ratchet pawl 42 pivotally mounted in a yoke 43 journaled on the pipe 20. A spring biases the pawl 42 to engage the wheel 41. To operate the yoke and pawl there is provided a variable speed motor 44 which, through a reducing gear 45, operates disk cranks 46 and 47 on the low speed shaft 48 of the reducing gear 45. To the disk crank 46 there is connected the tubular member 49 of a yieldable link which also comprises a rod 50 pivotally connected to the yoke 43 and telescoping into the member 49 and a spring 51 surrounding the rod 50 and tubular member 49 and held under compression by collars 491 and 501 on the member and rod, respectively. The spring 51 is confined under sufficient stress to operate the agitator H under normal operating conditions but is adapted to yield before the agitator is subjected to sufficient stress to cause a break of the agitator or any of the operating parts.

The agitator H is raised and lowered by means of a yoke 52 secured to a nut 54 carried by a rotatable threaded shaft 55 and engaging between collars 53 fixed on the pipe 20. The shaft 55 is mounted in fixed upper and lower bearings 56 and 57 respectively, and is rotated in either direction by means of a ratchet wheel 58 fixed on the threaded shaft 55 and a double acting ratchet pawl 59 pivotally mounted in a yoke 60 journalled on the threaded shaft 55. The yoke 60 is operated by a link 61 pivotally connected to the yoke 60 and to a pin 62 fixed in one of the openings 63 in the crank disk 47. The openings 63 in the crank disk are spaced at different distances from the center of the disk in order to permit of a variation in the number of teeth the ratchet wheel 58 is advanced by the pawl 59 at each operation. The pawl 59 is formed with the ratchet wheel engaging portions 591 and 592 on one side of its pivot point and on the other a recess 593 in which is engaged a spring pressed plunger 64 mounted in a carrier 65 pivotally supported in the yoke 60. To change the operation of the threaded shaft 55 so as to change the direction of movement of the pipe 20, the pawl 59 is operated so as to disengage the portion then engaged with the ratchet wheel and engage the other portion with the ratchet wheel. To operate the pawl, the nut 54 is provided with an arm 541 engaging a sleeve 66 arranged to slide on a fixedly mounted rod 67. Projecting from the sleeve 66 are arms 68 and 69 extending at different levels and in opposite directions from the sleeve 66. Pins 681 and 691 mounted in the arms 68 and 69, respectively, project toward the carrier 65 and are so positioned as to be engaged by the carrier 65 on opposite sides of its pivotal point when brought to the level of the carrier. The arms 68 and 69 and their respective pins being raised and lowered with the movement of the nut 54, operation of the nut 54 in one direction will bring one of the pins 681 and 691 into position to be engaged by the carrier 65, causing the carrier 65 to be shifted about its pivot and move the spring pressed plunger 64 from one end of the recess 593 to the other. Movement of plunger 64 in the recess 593 rocks the pawl 59 to disengage one ratchet wheel engaging portion and engage the other, the plunger then holding the pawl 59 in its new position. The positions of the arms 68 and 69 and their respective pins can be varied within limits so as to vary the extent of the vertical movement of the agitator H in the fuel bed but it will be noted the agitator H will always be below the upper level of the fuel bed during normal or usual operation of the gas producer. Both the vertical and horizontal movements of the agitator H are carried on simultaneously so that the agitator is gradually raised and lowered within the limits of its movement as it is rotated about in the fuel bed.

The action of the agitator H combined with the continuous feeding of fuel from the fuel bin C through a plurality of fuel feed chutes provides a deep, substantially uniform bed of cold fuel through which the gas passes and the fuel bed serves to cool the gas to such an extent that washing of the gas to effect a cooling thereof is unnecessary and the gas can be passed directly to a dust collector and pump without damaging such apparatus because of the temperature of the gas. Gas from the gas producer H accordingly passes through the outlet pipe 70 to the dust collector F, entering the dust collector through the tangentially arranged inlet 71 and, after passing around the interior of the dust collector, is discharged through the central vertical outlet pipe 72 to the pump G which discharges the gas to the main 73. The demand upon a gas producer fluctuates throughout its operation so, in order to insure the gas entering the dust collector at the proper velocity when the flow of gas is light, a pivotally mounted valve or gate 74 is placed in the inlet 71, the rod 75 on which the valve is mounted being extended above the inlet 71 and provided with lever 76. A spring 77 connected to the lever 76 and a suitable fixed adjacent member biases the valve 74 towards a closed position thus tending to restrict inlet passage 71 to the dust collector and making the effective opening of the inlet passage 71 vary approximately with the volume of gas passing through the passage.

I claim:

1. In an apparatus of the class described, a gas producer, a fuel feed bin, a plurality of main fuel feed chutes arranged around the periphery of said feed bin and gas producer and connecting said feed bin and gas producer, and branch fuel feed chutes extending from said main chutes to the center region of said gas producer, means confining the fuel fed by said branch fuel chute to said central region, in combination with an agitator member for the fuel bed which is continuously covered by the fuel in said bed, and operating means for rotating and raising and lowering said agitator member in said bed, whereby the formation of a channel through the center of said bed is prevented.

2. In apparatus of the class described, a gas producer, a fuel feed bin, continuously filled fuel feeding means supplying fuel from said feed bin to the side and central portions of said gas producer, an agitator member continuously covered in the fuel bed of said gas producer, and means comprising a ratchet wheel for continuously rotating said agitator, and a threaded vertical support turned by a ratchet wheel along which support said agitator is continuously raised and lowered thus maintaining a substantially level fuel bed.

3. In apparatus of the class described, a gas producer, a fuel feed bin, a fuel storage bin, feed chutes connecting said feed bin and gas producer, said storage and feed bins having alined discharge openings for discharging fuel from said storage bin to said feed bin and from said feed bin to said chutes, valves controlling said discharge openings, said valves consisting of circular disks, having circular openings therein lying wholly to one side of said shaft operating shafts for said discharge valves, each shaft being arranged to operate a discharge valve for each bin, the valves on each shaft controlling alined openings and having the valve openings in the disks relatively angularly displaced to prevent simultaneous opening of said alined discharge openings and interlocking means preventing operation of said shafts to open the discharge valves from both bins simultaneously.

4. In apparatus of the class described, a gas producer, a fuel feed bin, a fuel storage bin, feed chutes connecting said feed bin and gas producer, said storage and feed bins having alined discharge openings for discharging fuel from said storage bin to said feed bin and from said feed bin to said chutes, valves controlling said discharge openings, operating shafts for said discharge valves, each shaft being arranged to operate a discharge valve for each bin, the valves on each shaft controlling alined openings and being relatively angularly displaced to prevent simultaneous opening of said alined openings an arcuate member fixed to each shaft, a lever pivotally mounted intermediate its ends and arranged to be engaged with said arcuate members and cooperating means on said arcuate members and lever interlocking to prevent operation of said shafts so as to have discharge valves for both bins open at one time.

5. In apparatus of the class described, a gas producer, a fuel feed bin, a fuel storage bin, feed chutes connecting said feed bin and gas producer, said storage and feed bins having alined discharge openings for discharging fuel from said storage bin to said feed bin and from said feed bin to said chutes, valves controlling said discharge openings, operating shafts for said discharge valves, each shaft being arranged to operate a discharge valve for each bin, the valves on each shaft controlling alined openings and being relatively angularly displaced to prevent simultaneous opening of said alined openings an arcuate member fixed to each shaft, a lever pivotally mounted intermediate its ends and arranged to be engaged with said arcuate members, projecting means on said lever and cooperating means on said arcuate members interlocking to prevent operation of said shafts so as to have discharge valves for both bins open at one time.

6. In apparatus of the class described, a gas producer, a fuel feed bin, a fuel storage bin, feed chutes connecting said feed bin and gas producer, said storage and feed bins having alined discharge openings for discharging fuel from said storage bin to said feed bin and from said feed bin to said chutes, valves controlling said discharge openings, operating shafts for said discharge valves, each shaft being arranged to operate a discharge valve for each bin, the valves on each shaft controlling alined openings and being relatively angularly displaced to prevent simultaneous opening of said alined openings an arcuate member fixed to each shaft, a lever pivotally mounted intermediate its ends and arranged to be engaged with said arcuate members, pins projecting from said lever and pin engaging means on said arcuate members interlocking to prevent operation of said shafts so as to have discharge valves for both bins open at one time.

7. In apparatus of the class described, a gas producer, a fuel feed bin, a fuel storage bin, feed chutes connecting said feed bin and gas producer, said storage and feed bins having alined discharge openings for discharging fuel from said storage bin to said feed bin and from said feed bin to said chutes, valves controlling said discharge openings, operating shafts for said discharge valves, each shaft being arranged to operate a discharge valve for each bin, the valves on each shaft controlling alined openings and being relatively angularly displaced to prevent simultaneous opening thereof, and interlocking means preventing operation of said shafts so as to have discharge valves for both bins open at one time.

8. In apparatus of the class described, a gas producer, a fuel feed bin, continuously filled fuel feeding means supplying fuel from said feed bin to the side and central portions of said gas producer, said fuel feeding means projecting uniformly into said gas producer, an agitator continuously covered in the fuel bed of said gas producer below said fuel feeding means and operating means comprising a ratchet wheel for continuously rotating said agitator and a threaded vertical support turned by a ratchet wheel along which support said agitator is continuously raised and lowered thus maintaining a substantially level fuel bed in said gas producer.

9. In apparatus of the class described, a gas producer, a fuel feed bin, continuously filled fuel feeding means supplying fuel from said feed bin to the side and central portions of said gas producer, an agitator continuously covered in the fuel bed of said gas producer below said fuel feeding means and operating means comprising a ratchet wheel for continuously rotating said agitator and a threaded vertical support turned by a ratchet wheel along which support said agitator is continuously raised and lowered thus maintaining a substantially level fuel bed in said gas producer.

10. In apparatus of the class described, a gas producer, a fuel feed bin, continuously filled fuel feeding means supplying fuel from said feed bin to the side and central portions of said gas producer, said fuel feeding means projecting uniformly into said gas producer, an agitator continuously covered in the fuel bed of said gas producer below said fuel feeding means and operating means comprising a ratchet wheel for continuously rotating said agitator and a threaded vertical support turned by a ratchet wheel along which support said agitator is continuously raised and lowered thus maintaining the fuel bed substantially level at the ends of said fuel feeding means.

11. In an apparatus of the class described, a gas producer, a fuel feed bin, continuously filled fuel feeding means supplying fuel from said feed bin to the side and central portions of said gas producer, an agitator and operating means for rotating and for raising and lowering said agitator in the fuel bed of the gas producer, the agitator and the fuel feeding means cooperating to distribute rapidly the cold coal fed through said feeding means across the fuel bed, thus providing a substantially level layer of cold coal across the entire surface of the bed and lowering the temperature of the exit gas.

12. In an apparatus of the class described, a gas producer, a fuel feed bin, continuously filled fuel feeding means supplying fuel through peripheral feed chutes to the sides and through branches of these peripheral chutes to the center of said gas producer, an agitator continuously covered in the fuel bed of said gas producer, means for continuously raising and lowering said agitator thus maintaining a substantially level fuel bed, in combination with a dust collector receiving gas directly from said gas producer and means for maintaining the velocity of the gas substantially constant as it enters the dust collector.

13. In an apparatus of the class described, a gas producer, a fuel feed bin, continuously filled fuel feeding means supplying fuel through peripheral feed chutes to the sides and through branches of these peripheral chutes to the center of said gas producer, an agitator continuously covered in the fuel bed of said gas producer, means for continuously raising and lowering said agitator thus maintaining a substantially level fuel bed, a dust collector receiving gas directly from said gas producer, and a valve responsive to the flow of gas to said dust collector for restricting the passage to said dust collector.

14. In an apparatus of the class described, a gas producer, a fuel feed bin, continuously filled fuel feeding means supplying fuel through peripheral feed chutes to the sides and through branches of these peripheral chutes to the center of said gas producer, an agitator continuously covered in the fuel bed of said gas producer, means for continuously raising and lowering said agitator thus maintaining a substantially level fuel bed, a dust collector receiving gas directly from said gas producer and a valve responsive to the flow of gas to said dust collector for restricting the passage to said dust collector, in combination with means for delivering the gas from the dust collector under increased pressure, said means receiving the gas directly from said dust collector.

ALBERT LEET GALUSHA.

REFERENCES CITED

The following references are of record in the file of this patent:

UNITED STATES PATENTS

| Number | Name | Date |
| --- | --- | --- |
| 659,472 | Fraser | Oct. 9, 1900 |
| 809,023 | Skinner et al. | Jan. 2, 1906 |
| 1,901,807 | Galusha | Mar. 14, 1933 |
| 2,119,478 | Whiton, Jr. | May 31, 1938 |

FOREIGN PATENTS

| Number | Country | Date |
| --- | --- | --- |
| 6,719 | Great Britain | Jan. 19, 1905 |
| 808,118 | France | Jan. 29, 1937 |

OTHER REFERENCES

Rambush "Modern Gas Producers," pages 361-363.